(12) United States Patent
Evans et al.

(10) Patent No.: US 10,547,517 B2
(45) Date of Patent: *Jan. 28, 2020

(54) TWO-STAGE NETWORK SIMULATION

(71) Applicant: Cisco Technology, Inc., San Jose, CA (US)

(72) Inventors: John William Evans, Frome (GB); Arash Afrakhteh, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/209,379

(22) Filed: Dec. 4, 2018

(65) Prior Publication Data

US 2019/0104027 A1 Apr. 4, 2019

Related U.S. Application Data

(63) Continuation of application No. 15/286,426, filed on Oct. 5, 2016, now Pat. No. 10,205,636.

(51) Int. Cl.
| | | |
|---|---|---|
| *H04L 12/24* | (2006.01) | |
| *G06F 11/34* | (2006.01) | |
| *H04L 29/06* | (2006.01) | |
| *G06F 17/50* | (2006.01) | |

(52) U.S. Cl.
CPC ........ *H04L 41/145* (2013.01); *H04L 41/5019* (2013.01); *G06F 11/3457* (2013.01); *G06F 17/5009* (2013.01); *H04L 63/1408* (2013.01)

(58) Field of Classification Search
CPC . H04L 41/145; H04L 41/408; H04L 63/1408; G06F 17/5009; G06F 11/3457
See application file for complete search history.

(56) References Cited

U.S. PATENT DOCUMENTS

| | | | | |
|---|---|---|---|---|
| 5,440,719 | A * | 8/1995 | Hanes ................. | G06F 11/3447 703/21 |
| 6,014,697 | A * | 1/2000 | Lewis .................... | H04L 41/12 703/14 |
| 7,447,622 | B2 * | 11/2008 | Arama .................. | H04L 41/145 463/42 |
| 7,672,238 | B2 * | 3/2010 | Singh .................... | H04L 41/145 370/229 |
| 7,774,440 | B1 * | 8/2010 | Bagrodia ............. | H04L 41/0816 703/1 |
| 7,957,427 | B2 * | 6/2011 | Slutsman ............ | H04L 43/0852 370/238 |
| 8,045,561 | B1 | 10/2011 | Verma et al. | |
| 8,312,145 | B2 * | 11/2012 | Rabie .................. | H04L 41/0893 709/227 |
| 9,436,490 | B2 * | 9/2016 | Lin ...................... | G06F 9/45533 |
| 9,722,913 | B2 * | 8/2017 | Farmanbar ............ | H04L 45/121 |
| 9,740,816 | B2 * | 8/2017 | He ........................ | H04L 41/145 |
| 2005/0008014 | A1 | 1/2005 | Mitra et al. | |

(Continued)

*Primary Examiner* — Lashonda T Jacobs

(57) ABSTRACT

In an example, there is disclosed a computing apparatus, having: one or more logic elements, including at least a processor and a memory, providing a network simulation engine to: periodically perform a network traffic simulation; cache at least one network traffic simulation in a traffic state cache; receive a quest for additional network demand; and compute a network delta based at least in part on a difference between the request for additional network demand and the traffic state cache.

20 Claims, 9 Drawing Sheets

(56) References Cited

U.S. PATENT DOCUMENTS

| | | | |
|---|---|---|---|
| 2005/0204028 A1* | 9/2005 | Bahl | H04L 41/0873 709/223 |
| 2006/0187848 A1* | 8/2006 | Zaniolo | H04L 43/50 370/252 |
| 2007/0147246 A1* | 6/2007 | Hurley | H04L 43/00 370/232 |
| 2009/0059793 A1* | 3/2009 | Greenberg | H04L 41/0803 370/235 |
| 2010/0131650 A1* | 5/2010 | Pok | H04L 41/0896 709/226 |
| 2011/0255430 A1* | 10/2011 | Wakuda | H04L 41/145 370/252 |
| 2013/0104175 A1* | 4/2013 | Applegate | H04N 21/231 725/87 |
| 2013/0275108 A1* | 10/2013 | Sofka | G06Q 10/06 703/13 |
| 2013/0338990 A1* | 12/2013 | He | H04L 41/145 703/13 |
| 2013/0339500 A1* | 12/2013 | Antonov | H04L 65/602 709/223 |
| 2013/0340022 A1* | 12/2013 | Antonov | H04N 21/23439 725/116 |
| 2014/0046645 A1* | 2/2014 | White | G06F 17/509 703/13 |
| 2014/0090058 A1* | 3/2014 | Ward | H04L 63/1433 726/23 |
| 2014/0133302 A1* | 5/2014 | Fu | H04L 45/125 370/231 |
| 2014/0172393 A1* | 6/2014 | Kang | G06F 17/5009 703/6 |
| 2014/0173018 A1* | 6/2014 | Westphal | H04L 41/0823 709/213 |
| 2015/0095008 A1* | 4/2015 | Wang | G06F 11/3608 703/20 |
| 2015/0178129 A1* | 6/2015 | Dube | G06F 9/4881 718/106 |
| 2015/0193567 A1* | 7/2015 | Warshavsky | H04L 67/06 703/13 |
| 2016/0104088 A1* | 4/2016 | Hosoda | G06Q 10/06315 705/7.25 |
| 2016/0218917 A1* | 7/2016 | Zhang | H04L 49/35 |
| 2016/0218948 A1* | 7/2016 | Djukic | H04L 43/0876 |
| 2017/0264702 A1* | 9/2017 | Dao | H04L 49/901 |

* cited by examiner

TWO-STAGE NETWORK SIMULATION

CROSS-REFERENCE TO RELATED APPLICATION

This application is a continuation of and claims benefit to U.S. patent application Ser. No. 15/286,426, entitled "Two-Stage Network Simulation," filed on Oct. 5, 2016, now U.S. Pat. No. 10,205,636, the entirety of which application is incorporated herein by reference.

FIELD OF THE SPECIFICATION

This disclosure relates in general to the field of computer networking, and more particularly, though not exclusively to, a system and method for two-stage network simulation.

BACKGROUND

Multiprotocol Label Switching (MPLS) is a data-carrying technique for high-performance telecommunications networks. An MPLS instance may direct data from a first node to a second node based on, for example, path labels rather than network addresses. By design, the path labels may be significantly shorter than the network addresses. This helps to avoid process- or time-intensive tasks, such as looking up addresses in a routing table. Each path label may identify a virtual link, which may represent a path between the nodes. The "multi-protocol" aspect of MPLS implies that MPLS is suitable for encapsulating packets of many different network protocols and access technologies.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
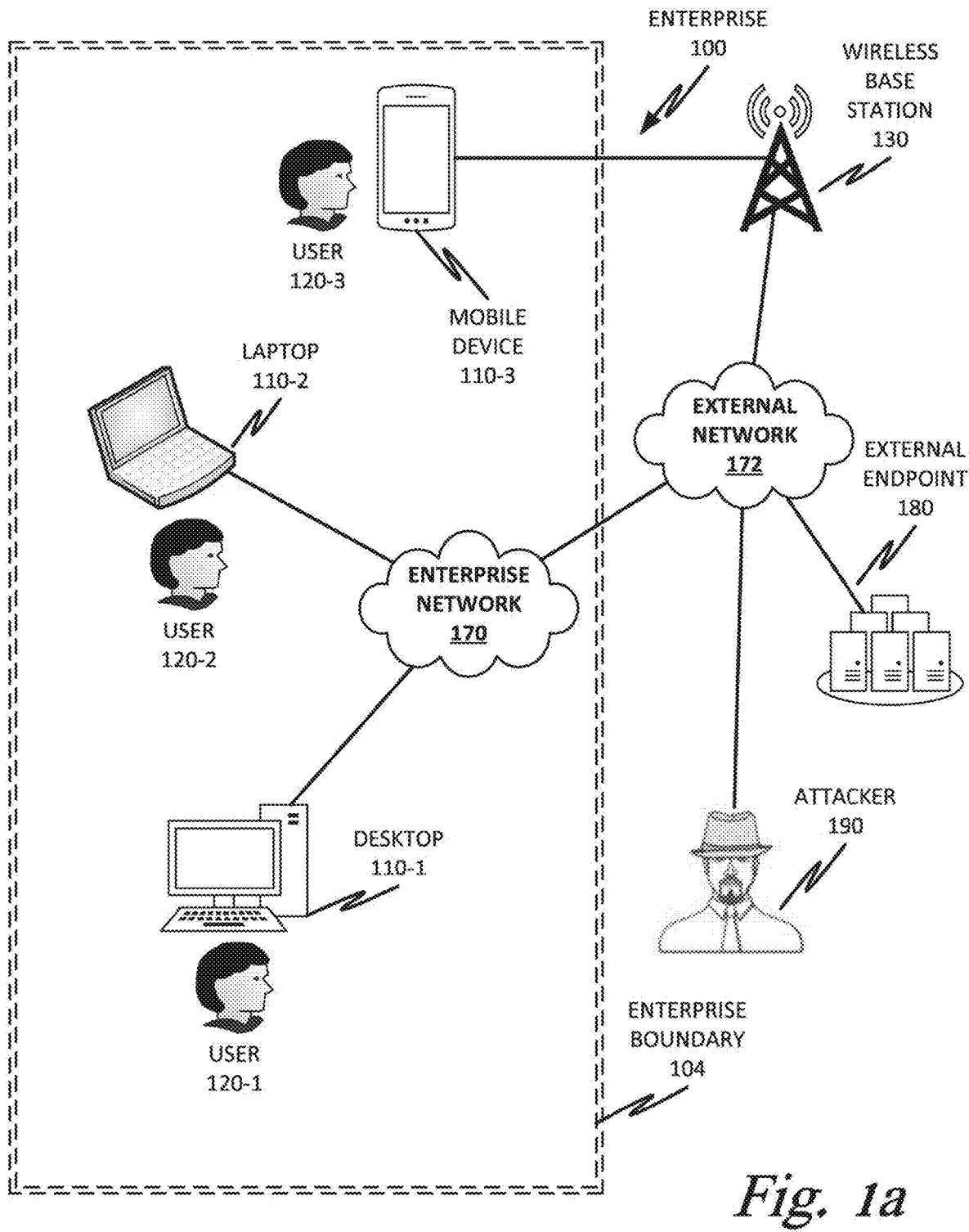
FIGS. 1A and 1B are block diagram of a network architecture according to one or more examples of the present specification.

In an example, there is disclosed a computing apparatus, having: one or more logic elements, including at least a processor and a memory, providing a network simulation engine to: periodically perform a network traffic simulation; cache at least one network traffic simulation in a traffic state cache; receive a quest for additional network demand; and compute a network delta based at least in part on a difference between the request for additional network demand and the traffic state cache.

Embodiments Of The Disclosure

The following disclosure provides many different embodiments, or examples, for implementing different features of the present disclosure. Specific examples of components and arrangements are described below to simplify the present disclosure. These are, of course, merely examples and are not intended to be limiting. Furthermore, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Administrators of internet protocol (IP) and MPLS networks may use tools for traffic management, including tools provided by Cisco® corporation and others. The emergence of software defined networks (SDNs) has increased interest in the concept of centralized network controllers and traffic management. In addition to the concept of traffic engineering, this specification describes a system and method for improved demand engineering, including an approach to traffic management through network and traffic aware service placement. This method employs a centralized controller that can be used both in SDNs and in other IP/MPLS networks.

In the presence of significant traffic growth, network operators are faced with the sometimes competing challenges of differentiating their services through providing service level agreement (SLA) guarantees while also managing their costs by optimizing network capacity and minimizing operational expenses.

To provide SLA guarantees, a network operator may need to ensure that it has available sufficient resources, relative to the actual offered traffic demand load. In turn, the goal of capacity management of any service is to ensure sufficient capacity to support the offered demands within the bounds of the required SLAs, optimally without gross over-provisioning.

In an example, capacity management includes the following:
  a. Network engineering—a long-term process to determine where to build network capacity based on where the network operator anticipates future network demand. Network engineering may generally operate over a timeframe of months or years.
  b. Capacity planning—a mid-term process to determine where to add network capacity based on where the network operator anticipates that capacity will first be exhausted. Capacity planning may generally operate over a timeframe of weeks or months.
  c. Traffic engineering (TE)—a short-term process of routing traffic to where the network capacity. For example, TE may include ensuring that installed capacity is efficiently used in practice. TE may generally operate over a timeframe of days or weeks.

Figure 4:
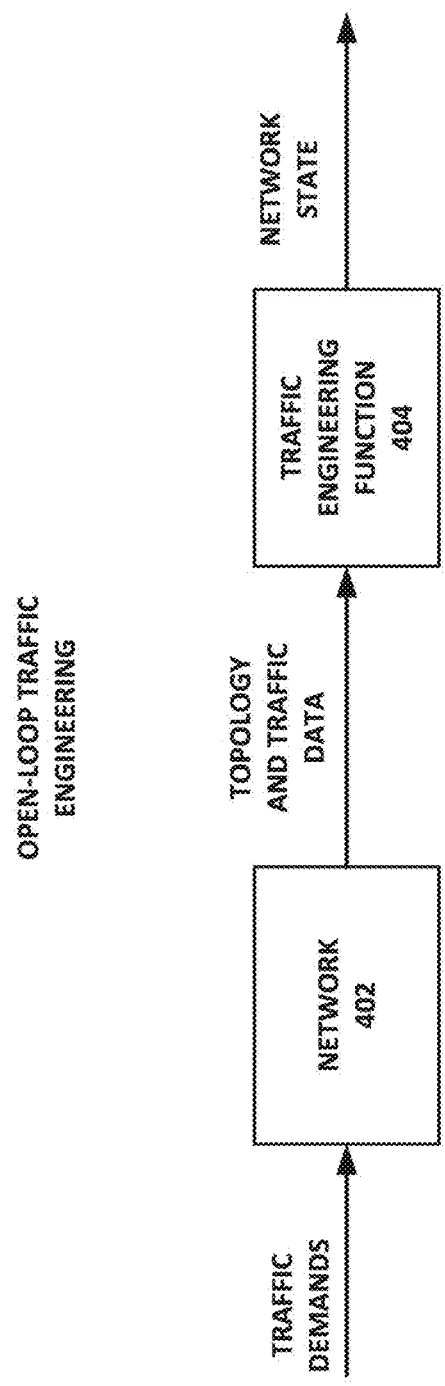
FIG. 4 is a block diagram of open-loop demand engineering according to one or more examples of the present specification.

As illustrated herein, such as in FIG. 4, these processes are open-loop systems that in certain embodiments provide no direct feedback between the network and the applications and services that use the network. Rather, network engineering and capacity planning try to predict what will happen in the future. Inevitably, predictions are imperfect, and errors in these predictions create risks such as not meeting SLAs (due to insufficient provisioned bandwidth) on the one hand, or over-provisioning, resulting in inefficient bandwidth usage on the other hand. Such risks may be exacerbated by highly dynamic service environments, with rapidly changing traffic profiles and service churn. TE attempts to optimize for short-term differences between the installed capacity and the offered traffic load. This responsiveness incurs the cost of the additional network complexity involved in deploying and managing traffic engineering mechanisms.

These capacity management processes may be augmented by admission control mechanisms, which can provide a closer coupling between the network and the applications and services using the network, for example providing the capability to verify whether there is sufficient capacity to support a new application or service before it is deployed. In practice, however, deployment of admission control mechanisms has been limited. Rather, network operators often address the SLA assurance and capacity management issues via either over-provisioning, or offering looser SLA assurances.

This specification describes an approach for and improvement to closely-coupled centralized traffic management called demand engineering. Demand engineering is a process by which network and traffic understanding is used to influence the siting of an application instance or the location where content will be accessed. Demand engineering is applicable to applications and services where there is a choice as to where the application endpoints may be located. For example:
 a. Cloud-based xAAS offerings: which is the best data center (DC) to site an Infrastructure as a Service (IAAS) instance?
 b. Peer-to-peer overlays: which is the best source peer for a particular piece of content?
 c. Content delivery networks: which is the best cache to use for a particular piece of content?
 d. Web applications: which is the best application server to use for a particular request?

For these applications and services, demand engineering is the process of determining the "best" location to site or locate a service instance, where best is determined using an understanding of the network topology and traffic and is defined in terms of both meeting the SLA requirements and making most effective use of the network capacity.

Figure 5:
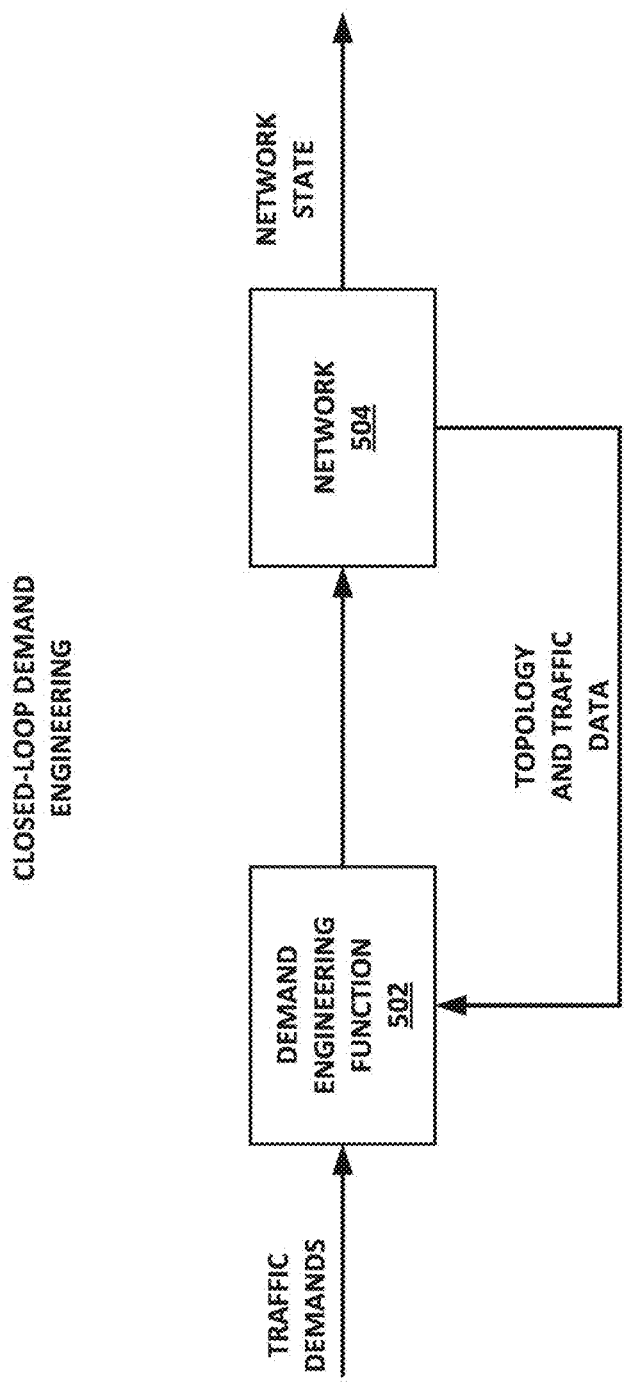
FIG. 5 is a block diagram of closed-loop demand engineering according to one or more examples of the present specification.

Demand engineering addresses the dual problem spaces covered by admission control and traffic engineering, without incurring some of the issues that sometimes limit their deployment. In an example, demand engineering directly influences the location of traffic sources and destinations, which indirectly impacts the paths that the application or services traffic demands take through the network. In contrast, traffic engineering does not necessarily influence the location of traffic sources and destinations, but rather directly influences the paths that demands take through the network between their predefined traffic sources and destinations. Thus, demand engineering is a proactive and transactional process that may be applied at the time of service instantiation, which creates a direct feedback loop between the network and the applications and services that use the network. This is illustrated in the illustration of FIG. 5.

Figure 6:
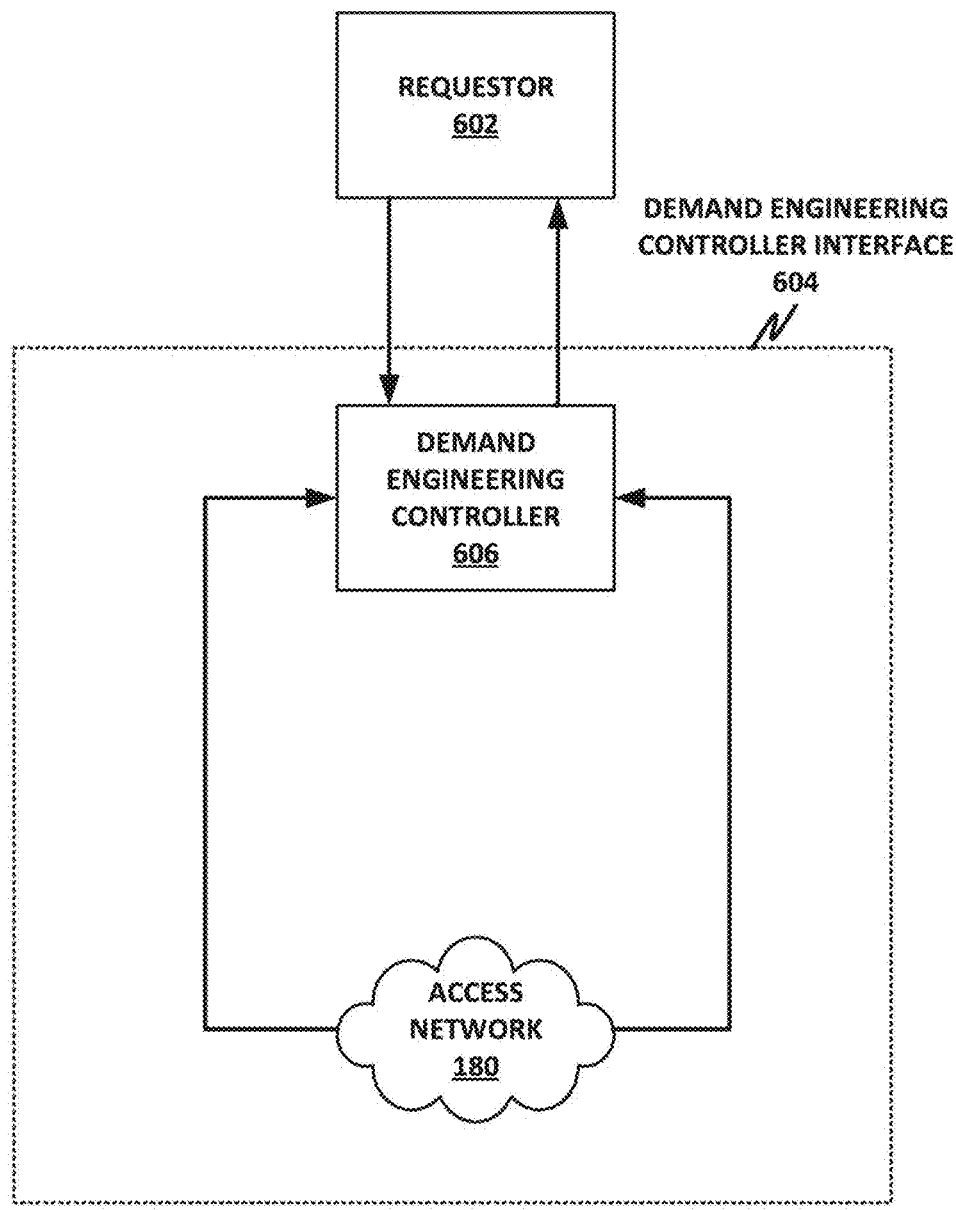
FIG. 6 is a block diagram of a demand engineering function according to one or more examples of the present specification.

Selected principles underlying demand engineering include:
 a. An application or service needs to create a new application or service instance, which will impose new bandwidth demands on the network, and there is a set of potential locations where that service instance may be instantiated.
 b. Demand Engineering Control Interface: Before creating the new instance, the application or service is able to request from the controller guidance on which endpoint to use. This guidance may be requested via any suitable interface. This request may include the following parameters:
  i. Demand source(s)
  ii. Demand destination(s)
  iii. Bandwidth required
  iv. Failure sets of interest
 c. Demand Engineering Controller. The control function understands the network topology and traffic, and is able to determine the impact that the new demands will have on the network. The controller may express this information so that it can determine which location is best, where "best" can mean, for example, that it is able to meet the application or service SLA requirements and is optimal from the perspective of making efficient use of network capacity. Note that the control function does not need to make the decision itself, but rather (at a minimum) it may be configured to respond with the information that the requestor needs to be able to make an informed decision itself while instantiating the application or service. This information may include, for example:
  i. Worst-case path latency
  ii. Worst-case path utilization
  iii. Network worst-case utilization There may be other context used in determining the best location to site a particular application or service, such as network performance or policy. This is illustrated in FIG. 6.

In a demand engineering instance, the intelligence for demand engineering may reside in a demand engineering controller.

In one nonlimiting example, the offline planning process involves determining the network topology, such as from an interior gateway protocol (IGP) database. A network traffic demand matrix may need to be deduced, such as from link utilization data. Routing of the traffic matrix may then be simulated on the network topology to determine link utilizations in different network situations (e.g. failure cases) and growth scenarios. In an example network, the time to derive the traffic matrix and perform the simulations can take many minutes, increasing with the size of the network (in terms of #links and #nodes) and most significantly with the size of the traffic matrix (in terms of # traffic demands).

This understanding is used to determine where the best location is to access a piece of content or to site a new application/service instance, where that instance is defined in terms of its traffic demand requirements, and where the traffic demands are specified in terms of the demand end point IP addresses and the bandwidth required. "Best" is defined by being able to meet the SLA requirements and make most effective use of the network capacity These offline planning processes may be adequate where the speed of new service provision is constrained by the time taken to provision a new access circuit, i.e. core network bandwidth planning and provisioning can keep pace with access network service provision. However, with cloud-based services and SDN providing the capability for real-time service provisioning, real-time network traffic management may be desirable to keep pace with the speed of service activation. To address this, the planning processes may be brought online. For example, when a request to provision a new service is made, real-time traffic management capabilities may be required to determine whether there is sufficient capacity to support the requested service (demand admission), and where that service may be placed when there is a choice (demand engineering). In this case, it may not be optimal to wait several minutes while the simulation is run.

In certain existing networks, the time to derive the traffic matrix and perform the simulations can take many seconds or even minutes, increasing with the size of the network (in terms of #links and #nodes) but most significantly the size of the traffic matrix (in terms of # traffic demands). For some applications (e.g. Cloud IAAS service provision) these delays may be acceptable, but for high transaction applications and services (e.g. web app load balancing, CDN) these delays are unacceptable.

This specification defines an approach that allows the demand deduction and simulation time for individual requests to be significantly reduced without impacting the fidelity of the result.

To provide more responsive demand engineering, embodiments of a traffic manager function (including, for example, a demand engineering controller function) of this disclosure provide a two-stage simulation protocol. This may include, for example:

a. Stage 1—The traffic manager performs a background process periodically, such as every five minutes, which is found to be an optimum interval in one particular embodiment (in that embodiment, no additional practical advantages are realized at frequencies greater than five minutes). In other embodiments, other suitable periods may be selected. Selecting a suitable period may comprise finding the highest frequency that the system supports, and that also continues to provide meaningful or substantial advantages over higher frequencies. For example, if the system can support no more than ten minute frequency, ten minutes may be selected. If the system can support up to seven minute frequencies, but no substantial advantages are found at frequencies higher than ten minutes, ten minutes may again be selected.
  i. The traffic manager polls the network for topology and traffic data.
  ii. The traffic manager deduces the network traffic demand matrix from its understanding of the network topology and polled traffic data (e.g. using network tomography).
  iii. The traffic manager simulates routing of the complete set of traffic demands on the discovered network topology to determine the resulting utilization of each link in the network, taking into account, for example, {link, node, shared risk link groups (SRLG)} failure cases if necessary.
  iv. The resulting link utilizations are cached for use in stage 2.ii below.

b. Stage 2—This stage is performed on a per-transaction basis, e.g., every time a request is received:
  i. The requester (e.g. which is looking to site the new application/service instance) makes a request of the traffic manager to place a new demand or demands.
  ii. The traffic manager simulates the routing of only the newly requested traffic demand(s) on the network topology discovered in stage 1 to determine the resulting traffic utilization of each link in the network, taking into account, for example, {link, node, SRLG} failure cases if necessary.
  iii. The resulting worst-case link utilizations are added to the corresponding link utilizations cached in stage 1.iv above, to derive an overall worst-case link utilization. This may be the same result as would be calculated if a single simulation was performed with the new demand added to the existing demands.
  iv. The traffic manager responds to the requester with the overall network worst-case utilization (or other optimization goal).

Although stage 1 may take multiple seconds to complete because of the large number of traffic demands that may be present on the network, stage 2, may be completed independent of the number of traffic demands.

This approach to network simulation allows fast simulation turnaround, with a response time that in certain embodiments is independent of the size of the network or number of traffic demands. Because the simulation is performed in two stages, the fast turnaround does not degrade the fidelity of the result. This enables network traffic management to keep pace with the speed of real-time service activation with cloud-based services and SDN.

This method makes the demand deduction and simulation time for stage 2 independent of the number of demands. Based on these results, in a network of about 100 k demands, even though stage 1 demand deduction and simulation may be around 62 seconds, stage 2 simulation would be around two to three microseconds. Note in practice, a number of the fixed components of delay experienced in testing would not apply and both stage 1 and stage 2 would be reduced accordingly.

Note that for a single request/response, the overall simulation time with the two-stage approach may be greater compared to running a single stage simulation with the new demands added (because of the overhead of multiple simulation runs is marginally increased). But the response time can be significantly reduced because stage 1 can be run as a background process before receiving the request. Where multiple requests/responses are processed within a single period, the overall simulation time is reduced compared to a single stage simulation. This requires less overall compute resources and hence improves scaling, and significantly reduces the response time for transaction triggered simulation, thus improving scaling.

A system and method for two-stage network simulation will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1A is a network-level diagram of an enterprise network operator 100 according to one or more examples of the present Specification. Enterprise 100 may be any suitable enterprise, including a business, agency, nonprofit organization, school, church, family, or personal network, by way of non-limiting example. In the example of FIG. 1A, a plurality of users 120 operate a plurality of endpoints or client devices 110. Specifically, user 120-1 operates desktop computer 110-1. User 120-2 operates laptop computer 110-2. And user 120-3 operates mobile device 110-3.

Each computing device may include an appropriate operating system, such as Microsoft Windows, Linux, Android, Mac OSX, Unix, or similar. Some of the foregoing may be more often used on one type of device than another. For example, desktop computer 110-1, which in one embodiment may be an engineering workstation, may be more likely to use one of Microsoft Windows, Linux, Unix, or Mac OSX. Laptop computer 110-2, which is usually a portable off-the-shelf device with fewer customization options, may be more likely to run Microsoft Windows or Mac OSX. Mobile device 110-3 may be more likely to run Android or iOS. However, these examples are for illustration only, and are not intended to be limiting.

Client devices 110 may be communicatively coupled to one another and to other network resources via enterprise network 170. Enterprise network 170 may be any suitable network or combination of one or more networks operating on one or more suitable networking protocols, including for example, a local area network, content-delivery network (CDN), an intranet, a virtual network, a wide area network, a wireless network, a cellular network, or the Internet (optionally accessed via a proxy, virtual machine, or other similar security mechanism) by way of nonlimiting example. In certain embodiments, enterprise network 170 may be, or may include, a software-defined network (SDN), which may include a number of virtual machines (VMs) that can be "spun up" or "spun down" on demand, according to immediate network needs. Enterprise network 170 may also include one or more servers, firewalls, routers, switches, security appliances, antivirus servers, or other useful network devices, along with appropriate software, any or all of which may be embodied in either physical servers or appliances, or VMs providing a network virtual function (NVF). In this illustration, enterprise network 170 is shown as a single network for simplicity, but in some embodiments, enterprise network 170 may include a more complex structure, such as one or more enterprise intranets connected to the Internet. Enterprise network 170 may also provide access to an external network 172, such as the Internet. External network 172 may similarly be any suitable type of network.

Networked enterprise 100 may encounter a variety of "network objects" on the network. A network object may be any object that operates on, interacts with, or is conveyed via enterprise network 170. In one example, objects may be broadly divided into hardware objects, including any physical device that communicates with or operates via the network, software objects, and other logical objects.

Networked enterprise 100 may communicate across enterprise boundary 104 with external network 172. Enterprise boundary 104 may represent a physical, logical, or other boundary. External network 172 may include, for example, websites, servers, network protocols, and other network-based services. In one example, network objects on external network 172 include a wireless base station 130, an application repository 182, an external endpoint 180, and an attacker 190. It may be a goal for enterprise 100 to provide information to external endpoint 180, or to provide for users 120 access to desirable services, while excluding malicious objects such as attacker 190.

Wireless base station 130 may provide mobile network services to one or more mobile devices 110, both within and without enterprise boundary 104.

Figure 1B:
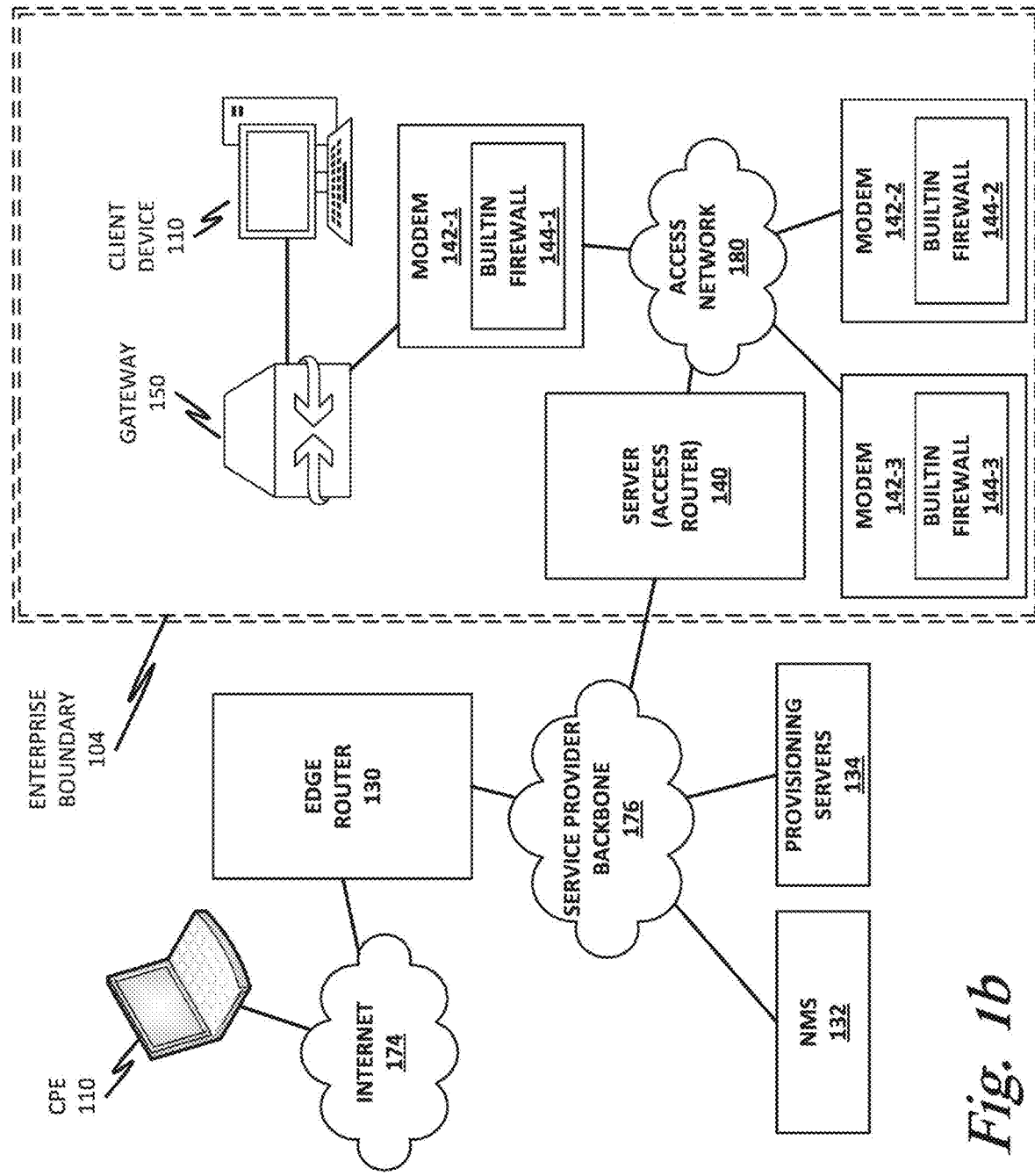

FIG. 1B is a simplified block diagram of a network that may include, for example, enterprise network 170 and external network 172. FIG. 1B includes provisioning servers 134, a network management system (NMS) server 132, an Internet 174, an edge router 130, a network operator backbone 176, a server-class device 140 such as an access router, an access network 180, a plurality of modems 142-1, 142-2, 142-3, a gateway 150, and customer premises equipment (CPE) such as a client device 110. Note that the foregoing functions are provided in a block diagram format to illustrate logical roles and interconnections in one nonlimiting example. However, the blocks disclosed here should not be construed as limited to individual devices. In many cases, some or all of the network, may be provided as a software-defined network (SDN), which may run in a "cloud" configuration, in which many different virtualized network functions (VNFs) are provided on virtual machines, which may run under a hypervisor. The machines that host these VNFs may be provided in a single, large data center, across multiple geographically-remote data centers, or provided in a co-hosting configuration in which the entity controlling the function does not necessarily control the physical hardware on which it is hosted.

In certain embodiments, NMS 132 may be provisioned as an SDN controller (SDN-C), which may provide services as described herein, including for example two-stage network simulation for demand engineering.

In some embodiments, a firewall may be provided in one or more gateways 150, CPE 110, and modems 142, by way of non-limiting example. Those with skill in the art will recognize that although firewalls 144 are shown in each of the foregoing, a firewall need not be included for the devices to function. Firewall 144 may also be, in some embodiments, a separate network device.

In general terms, the network can be configured to communicate with modems 142 to classify traffic. More specifically, access router 140 and modems 142 can use access control lists (ACLs) to identify important data. Note that while in the examples discussed herein, an ACL is used as a way to sort or to classify traffic, other methods may equally be used, such as a data over cable service interfaces specification (DOCSIS) classifier, a telecommunications access method (TCAM), etc.

The following foundational information may be viewed as a basis from which the present disclosure may be properly explained. Such information is offered earnestly for purposes of discussion only and, accordingly, should not be construed in any way to limit the broad scope of the present disclosure. DOCSIS is a telecommunications standard that permits the addition of high-speed data transfer to an existing cable TV (CATV) system. DOCSIS is employed by many cable television operators to provide Internet access over existing hybrid fiber-coaxial (HFC) infrastructure. A DOCSIS architecture generally includes two primary components: a cable modem (CM) located at a customer premises (e.g., more generally represented as modem 142) and a cable modem termination system (CMTS) located at a CATV headend (e.g., more generally represented as access router 140). Cable systems supporting on-demand programming typically use a hybrid fiber-coaxial system. Fiber optic lines bring digital signals to nodes in the system, where they are converted into RF channels and modem signals on coaxial trunk lines.

To identify important data flows, an access router (e.g., access router 140) can be configured with upstream and downstream ACLs. Each ACL may include expressions to match traffic at OSI Layer 2, Layer 3, Layer 4, or any suitable combination thereof. For each modem (e.g., modem 26a-c) in communication with the access router, the access router can monitor the data rate of packets matching ACLs. In an embodiment, each modem can be provisioned with the same or different ACLs that may or may not contain entries from the ACLs in the access router. In another embodiment, each modem may be provisioned with the same ACLs. The ACLs can include packet matching parameters, rate thresholds, time thresholds, timers, etc.

Note that DOCSIS Packet Classifiers are functionally equivalent to ACLs in this context. In an embodiment, when implementing the ACLs, packets such as Address Resolution Protocol (ARP) packets can be identified based on parameters such as the target address. An ARP may be filtered based on parameters within the body of the ARP (e.g., a target hardware address). Other network elements performing network traffic shaping functions may also use the ACLs to identify important traffic.

The access router can be configured to monitor the aggregate data rate used by a cable modem and adjust downstream/upstream channel allocation accordingly. By consolidating traffic on fewer channels, the access router can make a tradeoff between traffic engineering efficiency and modem power consumption. This may be beneficial when the overall network usage is low. Likewise, each modem may request a smaller channel set based on information from a CPE (e.g., CPE 110) or an end user.

Applications running on a CPE can initiate two-way network communications in response to user interaction and autonomously generated events. Network management systems (e.g., provisioning servers 134, NMS server 132, etc.) can initiate two-way network communications to agent processes in the CPE. Two-way communications generally have unicast IP source and destination addresses. Often, network management systems repeatedly transmit certain types of information in structures called data carousels. Data carousels may be addressed to broadcast or multicast destinations. Data carousels usually convey information that is needed by the CPE, but that is unsuitable for storage in the CPE's persistent memory. For instance, if the CPE is a set-top box, system information and program guide information changes occasionally and this information would not be reliable when the set-top box activates after a significant time offline. Carousels deliver data with performance independent of the number of set-top boxes served. In addition, broadcast carousels can remain effective in some situations, where upstream communications are impaired.

Several element management and provisioning protocols may use downstream datagram delivery that terminate at the CPE. Some of these datagrams may be unsolicited by the CPE and do not result in any attempt to respond with an acknowledgement. Examples include conditional access Entitlement Management Messages and MPEG DSM-CC passthrough messages when the CPE is a set-top box.

The modem might need to maintain values in memory including IP addresses, configuration file settings, service identifier (SID) values, downstream service identifier (DSID) values, service agreement identifier (SAID), BPI+ state, etc. The modem can be configured to keep track of elapsed time. In one example, the modem may be free from having to maintain autonomous tracking of elapsed time during a low-power dissipation state, even though some set-top boxes support scheduled events.

In an embodiment, messages from the network to the modem or CPE can be used to communicate policies such as duty cycle, always-be-on time window, whether the downstream receiver should continue to listen for control messages, etc. Policies of direct interest to the access router may be indicated in extensions in REG-REQ, REG-REQ-MP, REG-RSP and REG-RSP-MP DOCSIS MAC Management messages. The modem and the access router can implement these policies only partially and, thus, may need to be discovered or negotiated. In another embodiment, the ranging operations of the modem may be reduced when coming out of a low-power state. For example, the access router may continue to offer station maintenance opportunities so that the modem can go directly to station maintenance and skip initial maintenance.

Turning to the example infrastructure associated with present disclosure, CPE 110 can be associated with devices, customers, or end users wishing to receive data or content in energy management system 10 via some network. The term 'customer premise equipment' is inclusive of devices used to initiate a communication, such as a receiver, a computer, a set-top box, an Internet radio device (IRD), a cell phone, a smart phone, a tablet, a personal digital assistant (PDA), a Google Android, an iPhone, and iPad, or any other device, component, element, or object capable of initiating voice, audio, video, media, or data exchanges. CPE 110 may also be inclusive of a suitable interface to the human user, such as a display, a keyboard, a touchpad, a remote control, or other terminal equipment. CPE 110 may also be any device that seeks to initiate a communication on behalf of another entity or element, such as a program, a database, or any other component, device, element, or object capable of initiating an exchange. Data, as used herein in this document, refers to any type of numeric, voice, video, media, or script data, or any type of source or object code, or any other suitable information in any appropriate format that may be communicated from one point to another.

Network operator backbone 176 and Internet 174 each represent a series of points or nodes of interconnected communication paths for receiving and transmitting packets of information that propagate through networks. Network operator backbone 176 and internet 174 each offer a communicative interface between sources and/or hosts, and may be any appropriate network. A network can comprise any number of hardware or software elements coupled to (and in communication with) each other through a communications medium.

In one particular instance, the architecture of the present disclosure can be associated with a network operator digital subscriber line (DSL) deployment. In other examples, the architecture of the present disclosure would be equally applicable to other communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures, and DOCSIS cable television (CATV). The architecture of the present disclosure may include a configuration capable of transmission control protocol/internet protocol (TCP/IP) communications for the transmission and/or reception of packets in a network.

Access router 140 and modem 142 are network elements that can facilitate the networking activities discussed herein. As used herein in this Specification, the term 'network element' is meant to encompass any of the aforementioned elements, as well as switches, cable boxes of any kind (including set-top boxes), CMTSs, CMs, gateways, bridges, load balancers, firewalls, inline service nodes, proxies, servers, processors, modules, or any other suitable device, component, element, proprietary appliance, or object operable to exchange information in a network environment. These network elements may include any suitable hardware, software, components, modules, interfaces, or objects that facilitate the operations thereof. This may be inclusive of appropriate algorithms and communication protocols that allow for the effective exchange of data or information.

In one implementation, access router 140 and/or modem 142 include software to achieve (or to foster) the networking activities discussed herein. Additionally, each of these elements can have an internal structure (e.g., a processor, a memory element, etc.) to facilitate some of the operations described herein. In other embodiments, these networking activities may be executed externally to these elements, or included in some other network element to achieve the intended functionality. Alternatively, access router 140 and/or modem 142 may include software (or reciprocating software) that can coordinate with other network elements in order to achieve the networking activities described herein. In still other embodiments, one or several devices may include any suitable algorithms, hardware, software, components, modules, interfaces, or objects that facilitate the operations thereof.

Figure 2:
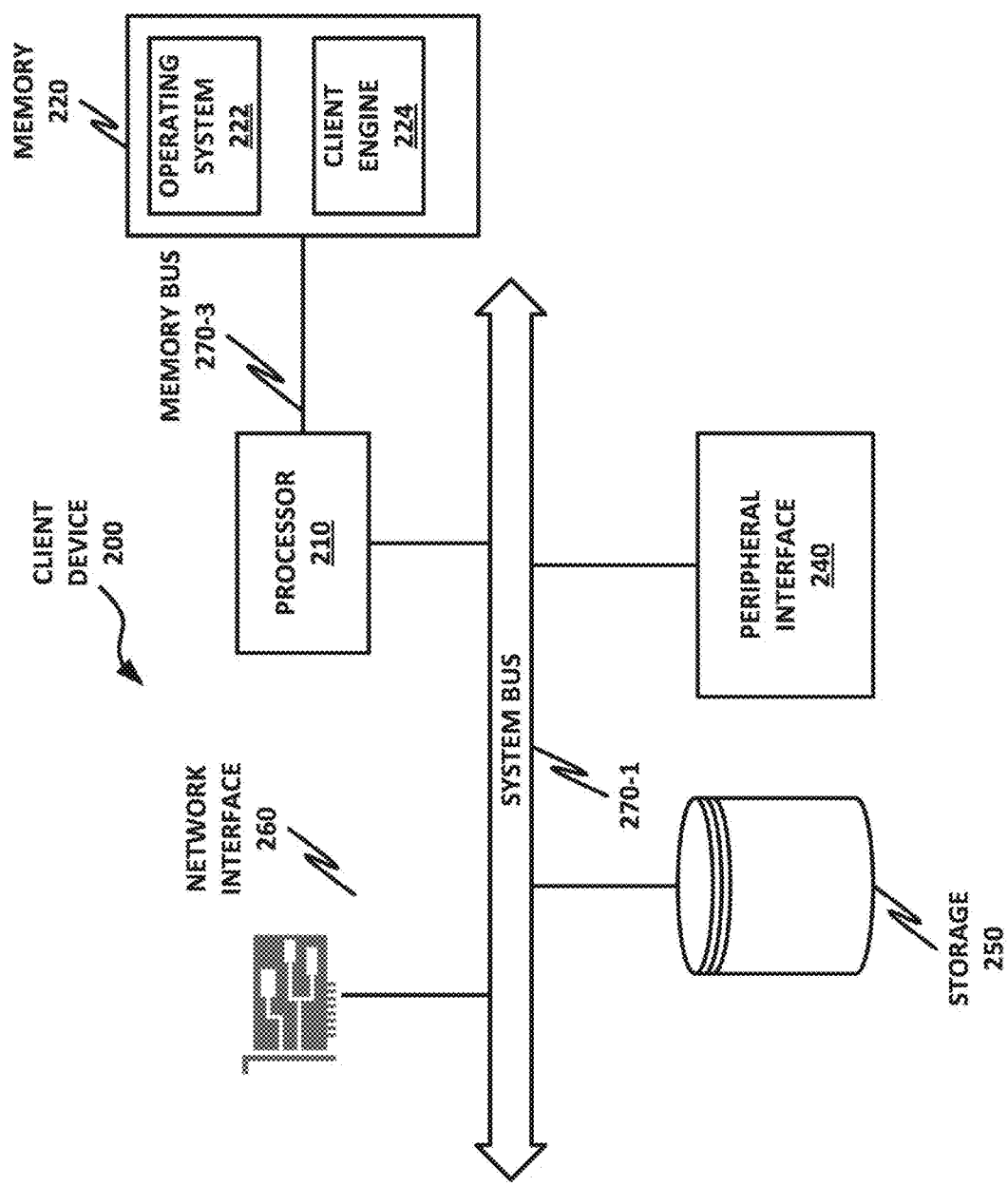
FIG. 2 is a block diagram of a client-class computing device, such as a customer-premises equipment (CPE) or endpoint device, according to one or more examples of the present specification.

Operation of the networks of FIG. 1A and 1B may be improved, for example by providing traffic engineering and/or demand engineering. In particular, as discussed above, any of the discrete devices disclosed herein may be provided a virtualized network functions (VNFs), in which case provisioning ("spinning up") or de-provisioning ("spinning down") a function will have an effect on network function and efficiency. Thus, demand engineering may be used to efficiently determine how and where to site new instances of VNFs. In certain embodiments, FIG. 2 is a block diagram of client device 200 according to one or more examples of the present specification. Computing device 200 may be any suitable computing device. In various embodiments, a "computing device" may be or comprise, by way of non-limiting example, a computer, workstation, server, mainframe, virtual machine (whether emulated or on a "bare-metal" hypervisor), embedded computer, embedded controller, embedded sensor, personal digital assistant, laptop computer, cellular telephone, IP telephone, smart phone, tablet computer, convertible tablet computer, computing appliance, network appliance, receiver, wearable computer, handheld calculator, or any other electronic, microelectronic, or microelectromechanical device for processing and communicating data. Any computing device may be designated as a host on the network. Each computing device may refer to itself as a "local host," while any computing device external to it may be designated as a "remote host."

In certain embodiments, client devices 110 may all be examples of computing devices 200.

Computing device 200 includes a processor 210 connected to a memory 220, having stored therein executable instructions for providing an operating system 222 and at least software portions of a client engine 224. Other components of client device 200 include a storage 250, network interface 260, and peripheral interface 240. This architecture is provided by way of example only, and is intended to be non-exclusive and non-limiting. Furthermore, the various parts disclosed are intended to be logical divisions only, and need not necessarily represent physically separate hardware and/or software components. Certain computing devices provide main memory 220 and storage 250, for example, in a single physical memory device, and in other cases, memory 220 and/or storage 250 are functionally distributed across many physical devices. In the case of virtual machines or hypervisors, all or part of a function may be provided in the form of software or firmware running over a virtualization layer to provide the disclosed logical function. In other examples, a device such as a network interface 260 may provide only the minimum hardware interfaces necessary to perform its logical operation, and may rely on a software driver to provide additional necessary logic. Thus, each logical block disclosed herein is broadly intended to include one or more logic elements configured and operable for providing the disclosed logical operation of that block. As used throughout this specification, "logic elements" may include hardware, external hardware (digital, analog, or mixed-signal), software, reciprocating software, services, drivers, interfaces, components, modules, algorithms, sensors, components, firmware, microcode, programmable logic, or objects that can coordinate to achieve a logical operation.

In an example, processor 210 is communicatively coupled to memory 220 via memory bus 270-3, which may be for example a direct memory access (DMA) bus by way of example, though other memory architectures are possible, including ones in which memory 220 communicates with processor 210 via system bus 270-1 or some other bus. Processor 210 may be communicatively coupled to other devices via a system bus 270-1. As used throughout this specification, a "bus" includes any wired or wireless interconnection line, network, connection, bundle, single bus, multiple buses, crossbar network, single-stage network, multistage network or other conduction medium operable to carry data, signals, or power between parts of a computing device, or between computing devices. It should be noted that these uses are disclosed by way of non-limiting example only, and that some embodiments may omit one or more of the foregoing buses, while others may employ additional or different buses.

In various examples, a "processor" may include any combination of logic elements operable to execute instructions, whether loaded from memory, or implemented directly in hardware, including by way of non-limiting example a microprocessor, digital signal processor, field-programmable gate array, graphics processing unit, programmable logic array, application-specific integrated circuit, or virtual machine processor. In certain architectures, a multi-core processor may be provided, in which case processor 210 may be treated as only one core of a multi-core processor, or may be treated as the entire multi-core processor, as appropriate. In some embodiments, one or more co-processor may also be provided for specialized or support functions.

Processor 210 may be connected to memory 220 in a DMA configuration via DMA bus 270-3. To simplify this disclosure, memory 220 is disclosed as a single logical block, but in a physical embodiment may include one or more blocks of any suitable volatile or non-volatile memory technology or technologies, including for example DDR RAM, SRAM, DRAM, cache, L1 or L2 memory, on-chip memory, registers, flash, ROM, optical media, virtual memory regions, magnetic or tape memory, or similar. In certain embodiments, memory 220 may comprise a relatively low-latency volatile main memory, while storage 250 may comprise a relatively higher-latency non-volatile memory. However, memory 220 and storage 250 need not be physically separate devices, and in some examples may represent simply a logical separation of function. It should also be noted that although DMA is disclosed by way of non-limiting example, DMA is not the only protocol consistent with this specification, and that other memory architectures are available.

Storage 250 may be any species of memory 220, or may be a separate device. Storage 250 may include one or more non-transitory computer-readable mediums, including by way of non-limiting example, a hard drive, solid-state drive, external storage, redundant array of independent disks (RAID), network-attached storage, optical storage, tape drive, backup system, cloud storage, or any combination of the foregoing. Storage 250 may be, or may include therein, a database or databases or data stored in other configurations, and may include a stored copy of operational software such as operating system 222 and software portions of client engine 224. Many other configurations are also possible, and are intended to be encompassed within the broad scope of this specification.

Network interface 260 may be provided to communicatively couple client device 200 to a wired or wireless network. A "network," as used throughout this specification, may include any communicative platform operable to exchange data or information within or between computing devices, including by way of non-limiting example, an ad-hoc local network, an internet architecture providing computing devices with the ability to electronically interact, a plain old telephone system (POTS), which computing devices could use to perform transactions in which they may be assisted by human operators or in which they may manually key data into a telephone or other suitable electronic equipment, any packet data network (PDN) offering a communications interface or exchange between any two nodes in a system, or any local area network (LAN), metropolitan area network (MAN), wide area network (WAN), wireless local area network (WLAN), virtual private network (VPN), intranet, or any other appropriate architecture or system that facilitates communications in a network or telephonic environment.

Client engine 224, in one example, is operable to carry out computer-implemented methods as described in this specification. Client engine 224 may include one or more tangible non-transitory computer-readable mediums having stored thereon executable instructions operable to instruct a processor to provide a client engine 224. As used throughout this specification, an "engine" includes any combination of one or more logic elements, of similar or dissimilar species, operable for and configured to perform one or more methods provided by the engine. Thus, client engine 224 may comprise one or more logic elements configured to provide methods as disclosed in this specification. In some cases, client engine 224 may include a special integrated circuit designed to carry out a method or a part thereof, and may also include software instructions operable to instruct a processor to perform the method. In some cases, client engine 224 may run as a "daemon" process. A "daemon" may include any program or series of executable instructions, whether implemented in hardware, software, firmware, or any combination thereof, that runs as a background process, a terminate-and-stay-resident program, a service, system extension, control panel, bootup procedure, BIOS subroutine, or any similar program that operates without direct user interaction. In certain embodiments, daemon processes may run with elevated privileges in a "driver space," or in ring 0, 1, or 2 in a protection ring architecture. It should also be noted that client engine 224 may also include other hardware and software, including configuration files, registry entries, and interactive or user-mode software by way of non-limiting example.

In one example, client engine 224 includes executable instructions stored on a non-transitory medium operable to perform a method according to this specification. At an appropriate time, such as upon booting client device 200 or upon a command from operating system 222 or a user 120, processor 210 may retrieve a copy of the instructions from storage 250 and load it into memory 220. Processor 210 may then iteratively execute the instructions of client engine 224 to provide the desired method.

Peripheral interface 240 may be configured to interface with any auxiliary device that connects to client device 200 but that is not necessarily a part of the core architecture of client device 200. A peripheral may be operable to provide extended functionality to client device 200, and may or may not be wholly dependent on client device 200. In some cases, a peripheral may be a computing device in its own right. Peripherals may include input and output devices such as displays, terminals, printers, keyboards, mice, modems, data ports (e.g., serial, parallel, USB, Firewire, or similar), network controllers, optical media, external storage, sensors, transducers, actuators, controllers, data acquisition buses, cameras, microphones, speakers, or external storage by way of non-limiting example.

In one example, peripherals include display adapter 242, audio driver 244, and input/output (I/O) driver 246. Display adapter 242 may be configured to provide a human-readable visual output, such as a command-line interface (CLI) or graphical desktop such as Microsoft Windows, Apple OSX desktop, or a Unix/Linux X Window System-based desktop. Display adapter 242 may provide output in any suitable format, such as a coaxial output, composite video, component video, VGA, or digital outputs such as DVI or HDMI, by way of nonlimiting example. In some examples, display adapter 242 may include a hardware graphics card, which may have its own memory and its own graphics processing unit (GPU). Audio driver 244 may provide an interface for audible sounds, and may include in some examples a hardware sound card. Sound output may be provided in analog (such as a 3.5 mm stereo jack), component ("RCA") stereo, or in a digital audio format such as S/PDIF, AES3, AES47, HDMI, USB, Bluetooth or Wi-Fi audio, by way of non-limiting example.

Figure 3:
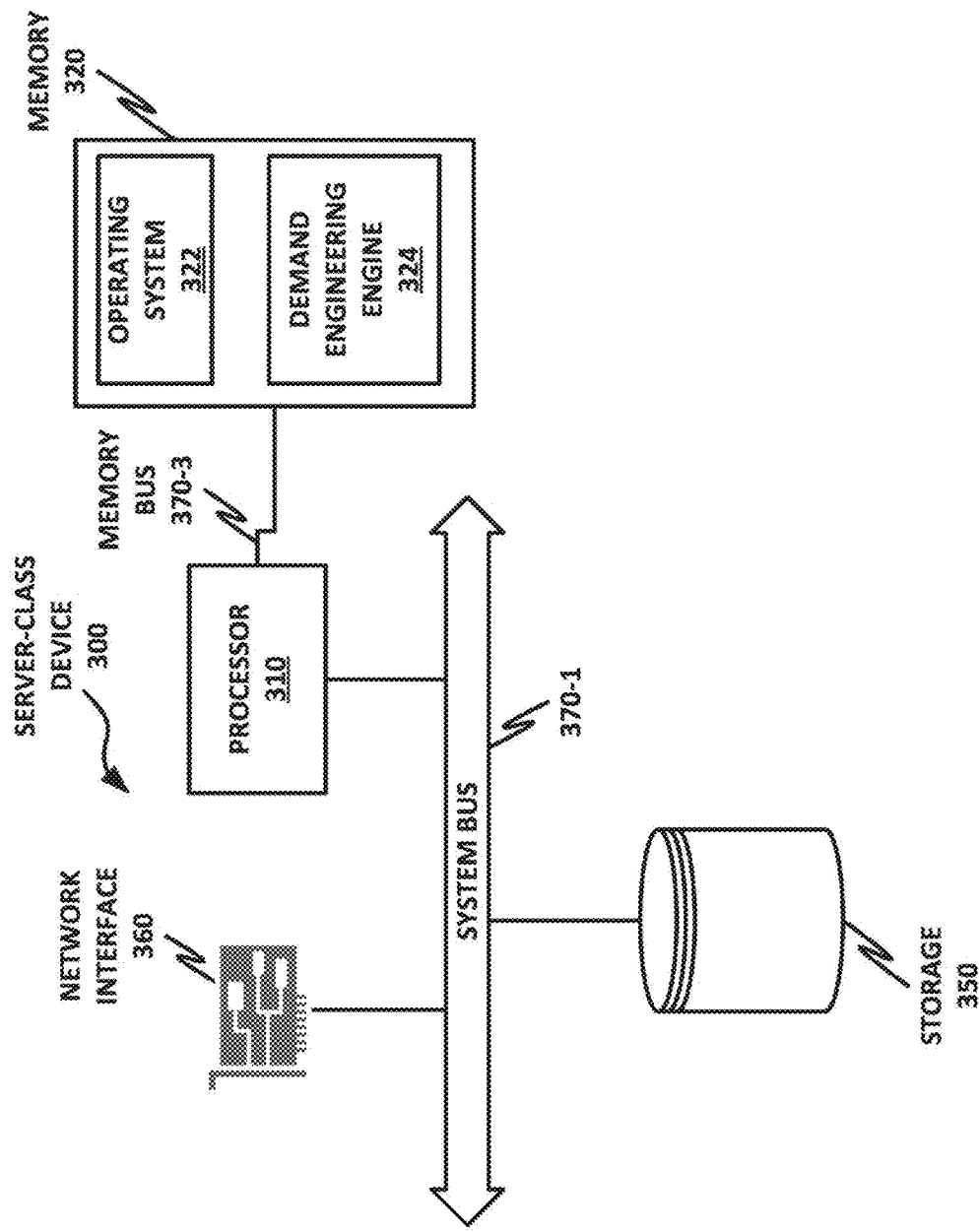
FIG. 3 is a block diagram of a server-class computing device according to one or more examples of the present specification.

FIG. 3 is a block diagram of a server-class device 300 according to one or more examples of the present specification. Server 300 may be any suitable computing device, as described in connection with FIG. 2. In general, the definitions and examples of FIG. 2 may be considered as equally applicable to FIG. 3, unless specifically stated otherwise. Server 300 is described herein separately to illustrate that in certain embodiments, logical operations according to this specification may be divided along a client-server model, wherein client device 200 provides certain localized tasks, while server 300 provides certain other centralized tasks. In contemporary practice, server 300 is more likely than client device 200 to be provided as a "headless" VM running on a computing cluster, or as a standalone appliance, though these configurations are not required.

Server 300 includes a processor 310 connected to a memory 320, having stored therein executable instructions for providing an operating system 322 and at least software portions of a demand engineering engine 324. Other components of server 300 include a storage 350, network interface 360, and peripheral interface 340. As described in FIG. 2, each logical block may be provided by one or more similar or dissimilar logic elements.

In an example, processor 310 is communicatively coupled to memory 320 via memory bus 370-3, which may be for example a direct memory access (DMA) bus. Processor 310 may be communicatively coupled to other devices via a system bus 370-1.

Processor 310 may be connected to memory 320 in a DMA configuration via DMA bus 370-3, or via any other suitable memory configuration. As discussed in FIG. 2, memory 320 may include one or more logic elements of any suitable type.

Storage 350 may be any species of memory 320, or may be a separate device, as described in connection with storage 250 of FIG. 2. Storage 350 may be, or may include therein, a database or databases or data stored in other configurations, and may include a stored copy of operational software such as operating system 322 and software portions of demand engineering engine 324.

Network interface 360 may be provided to communicatively couple server 140 to a wired or wireless network, and may include one or more logic elements as described in FIG. 2.

Demand engineering engine 324 is an engine as described in FIG. 2 and, in one example, includes one or more logic elements operable to carry out computer-implemented methods as described in this specification. Software portions of demand engineering engine 324 may run as a daemon process.

Demand engineering engine 324 may include one or more non-transitory computer-readable mediums having stored thereon executable instructions operable to instruct a processor to provide a client engine. At an appropriate time, such as upon booting server 140 or upon a command from operating system 322 or a user 120, processor 310 may retrieve a copy of demand engineering engine 324 (or software portions thereof) from storage 350 and load it into memory 320. Processor 310 may then iteratively execute the instructions of demand engineering engine 324 to provide the desired method.

FIG. 4 is a block diagram of open-loop traffic engineering according to one or more examples of the present specification. In this example, a network 402 is under traffic demands. Network 402 may be any of the networks disclosed herein, and in certain embodiments may be a SDN. A traffic engineering function 404 is provided, and may include for example an SDN-C, as well as human intelligence and input, which together may be used to analyze topology and network traffic and determine optimal network configurations.

In an example, traffic engineering is a short term process of routing traffic to wherever the network capacity is. This may ensure that the installed capacity is used efficiently. Traffic engineering normally operates over a timeframe of days or weeks, and may include direct human interaction.

In this example, traffic engineering is an open-loop process with direct feedback between the network and the applications and services that use the network. Network engineering and capacity planning try to predict what will happen in the future. Traffic engineering attempts to optimize for short term differences between the installed capacity and the offered traffic load. However, this responsiveness incurs the cost of additional network complexity involved in deploying and managing traffic engineering mechanisms.

A final output of traffic engineering function 404 may include a network state.

FIG. 5 is a block diagram of closed-loop demand engineering according to one or more examples of the present specification.

In this example, a demand engineering function (DEF) 502 is provided to analyze incoming traffic demands on network 504. Network 504 may be any of the networks disclosed herein, including an SDN. DEF 502 may include, for example, and SDN-C, including human input and intelligence where appropriate.

Demand engineering addresses the dual problem spaces covered by admission control and traffic engineering, without some of their respective and collective limitations. Demand engineering directly influences the location of traffic sources and destinations, which indirectly impacts the paths that the application or services traffic demands take through the network. In contrast, traffic engineering has no influence over the location of traffic sources and destinations, but rather directly influences the paths that demands take through the network between their predefined traffic sources and destinations. Demand engineering is a proactive and transactional process that is applied at the time of service instantiation, which creates a direct feedback loop between the network and the applications and services that use the network, and hence does not suffer from the error and resulting risks of some other capacity management approaches.

FIG. 6 is a block diagram of demand engineering according to one or more examples of the present specification. In this example, a requestor 602 queries a demand engineering controller 606 for information that may inform network management decisions. Access may be via a demand engineering controller interface 604, which may include a physical or logical interface, as well as an application programming interface (API), translation layer, or other media that enable requestor 602 to communicate effectively with demand engineering controller 606. Demand engineering controller 606 ultimately analyzes the state of an access network 180 or other network as appropriate.

Demand engineering controller functions include, by way of nonlimiting example:

a. Receiving requests, from requestor 602, via demand engineering controller interface 604, for capacity between network end points.

b. Determining what impact the new demands will have on the network from the perspective of making efficient use of network capacity, while also meeting the SLA requirements for the demands. This assumes that demand engineering controller 606 has a view of the network topology, the network traffic demand matrix, and the network routing behavior (which may include, by way of nonlimiting example, IGP, BGP, and RSVP-TE). Thus, demand engineering controller 606 may determine, via network simulation, the worst-case traffic utilization of each link in the network with the new demands added, taking into account failure cases if necessary. This view of the network can extend end-to-end across both L2 and L3. The controller itself may determine the traffic demand matrix from a previous reservation state or from the network traffic state (it may be the current state or during some previous time period), or from a combination of both approaches.

c. Replying with this information to requestor 602, which may then compare this result with the results of other requests, ultimately to determine where to site the application/service instance.

In some cases, (b) above may be considered as an extension to an admission control decision. For example:

a. Admission control: does the network have capacity to support demand D between site A and site B?

b. Demand engineering: how much capacity is remaining (R) if the network supports demand D between site A and site B? If T represents the threshold of maximum acceptable utilisation, i.e. to ensure that the SLA requirements can be met by controlling potential queuing latency, $R<(1-T)$ equates to an admission control failure. If $R>(1-T)$, assuming other factors are equal, sites with greater R would be preferred as these make more efficient use of network capacity. Note that it is possible to perform demand engineering without admission control (i.e., maximizing R), or admission control without demand engineering (i.e., enforcing T), or both together.

Note that this is a simplification to illustrate the principle. In practice, the demand engineering controller may need to respond with a measure of a specific optimization metric rather than R. In addition, demand propagation latency may be taken into account in making the decision.

The problem of demand engineering may be defined as a mathematical optimization problem, or in other words, a computational problem in which the objective is to find the best of all possible solutions. Given a fixed network topology, an existing set of traffic demands and new demands to place, the optimization problem can be defined as determining the placement of those new demands that meets the SLA goals and makes most effective use of capacity.

To solve this problem, the demand engineering controller must know what "most effective" means. Many different optimization goals are possible. For example, network worst-case utilization is a common metric used in traffic engineering optimization, and allows demand engineering to be compared against different traffic engineering strategies and other workload placement schemes.

Also note that modern networks are subject to failure. In large IP/MIPLS networks, hardware failure of some network element may be a weekly or more common occurrence. This could include an interface card going down, a fiber cut, a hard disk failure, failure of a cooling unit, or failure of a processor. So in network operators' networks, it is customary to provision sufficient capacity to deal with the traffic rerouting that occurs under such failure events. Worst-case utilization can be used to characterize the network utilization in a number of potential failure scenarios. For example:
  a. No failures: i.e. normal network conditions.
  b. Single circuit failures: a circuit may fail on its own, for example due to a failure in the underlying transport network.
  c. Single node failures: a node (e.g. router) may fail on its own.
  d. Shared risk failure. Groups of circuits or nodes that may fail simultaneously as a result of a single event. For example, a fiber cut fails all the circuits traversing the fiber; a power outage may impact all routers in a POP. Components that have common failure dependencies are defined as belonging to the same shared risk, also known as shared risk link groups (SRLGs), and the failure of that shared risk models the failure of its constituent components.

Given a particular link, the worst-case utilization under a set of failure scenarios is the maximum utilizations determined for that link over all of the failure scenarios in the set. Worst-case link utilizations are useful for identifying bottlenecks in the network that will only become apparent when a particular failure occurs. The overall network worst-case utilizations is the maximum worst-case link utilizations over all links in the network under evaluation, which summarizes how resilient the network is to network failure.

Network worst-case utilization is inversely related to the maximum resilient throughput achievable in a network. This is the maximum throughput achievable, assuming that all demands grow uniformly, before the utilization on any link, in any failure scenario of interest, exceeds a certain threshold. In minimizing network worst-case utilization, the resilient throughput achievable is maximized, i.e. the net effect is that the network cannot support more traffic without a capacity upgrade. So minimization of the network worst-case utilization is a simple goal that is used to guide traffic engineering optimization, and which can similarly be used to guide optimization through demand engineering. But it is often possible to decrease worst-case utilization in a network by routing traffic far away from the shortest path to the destination, which may result in an unacceptable increase in latency. So in practice, utilization reduction may be traded off against latency and may be accompanied by the capability to ensure that demand latency bounds are maintained to ensure that the SLA requirements can be met.

Figure 7A:
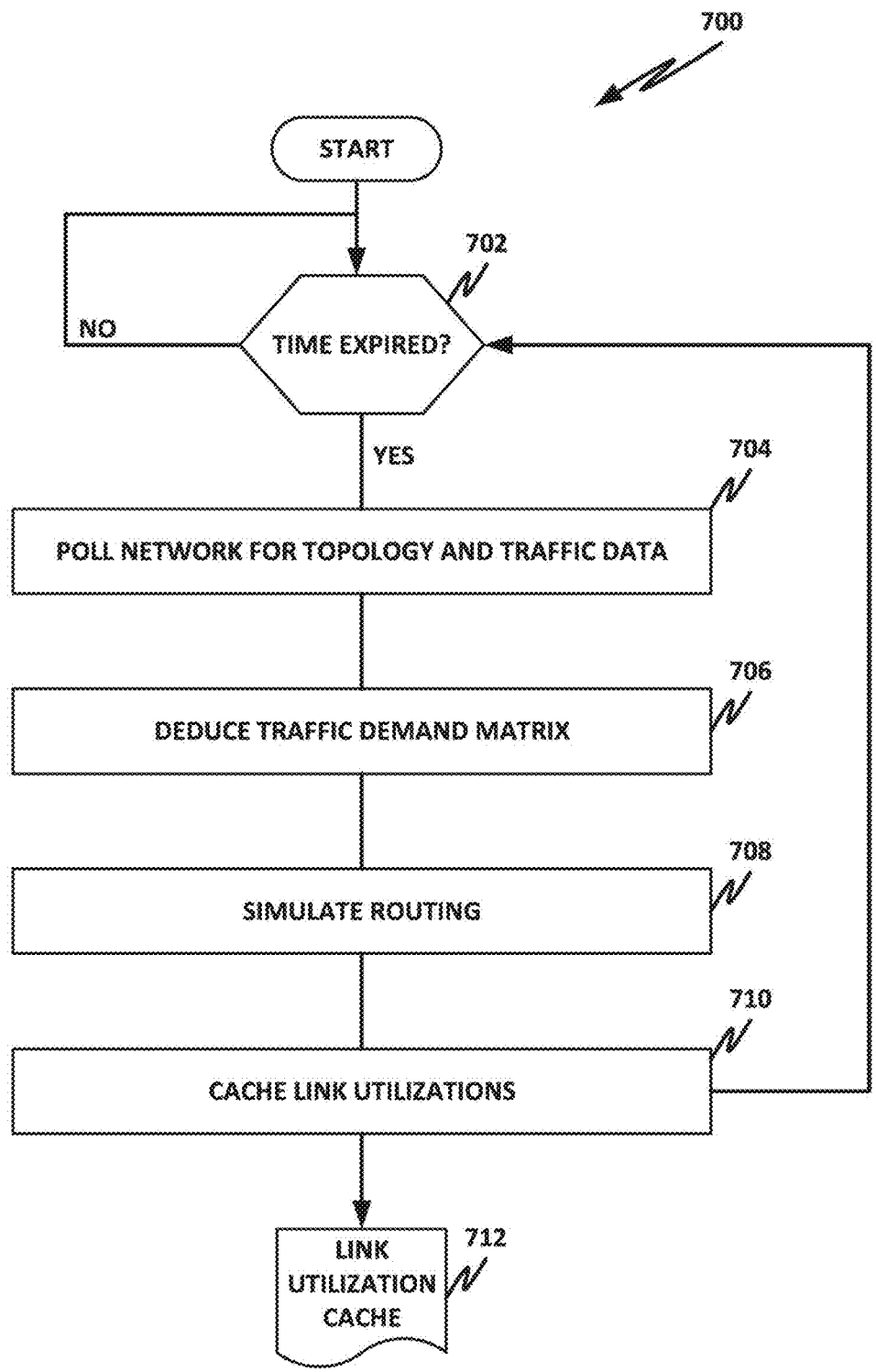
FIG. 7A and 7B are flow charts of a method of two-stage traffic simulation according to one or more examples of the present specification.
Figure 7B:
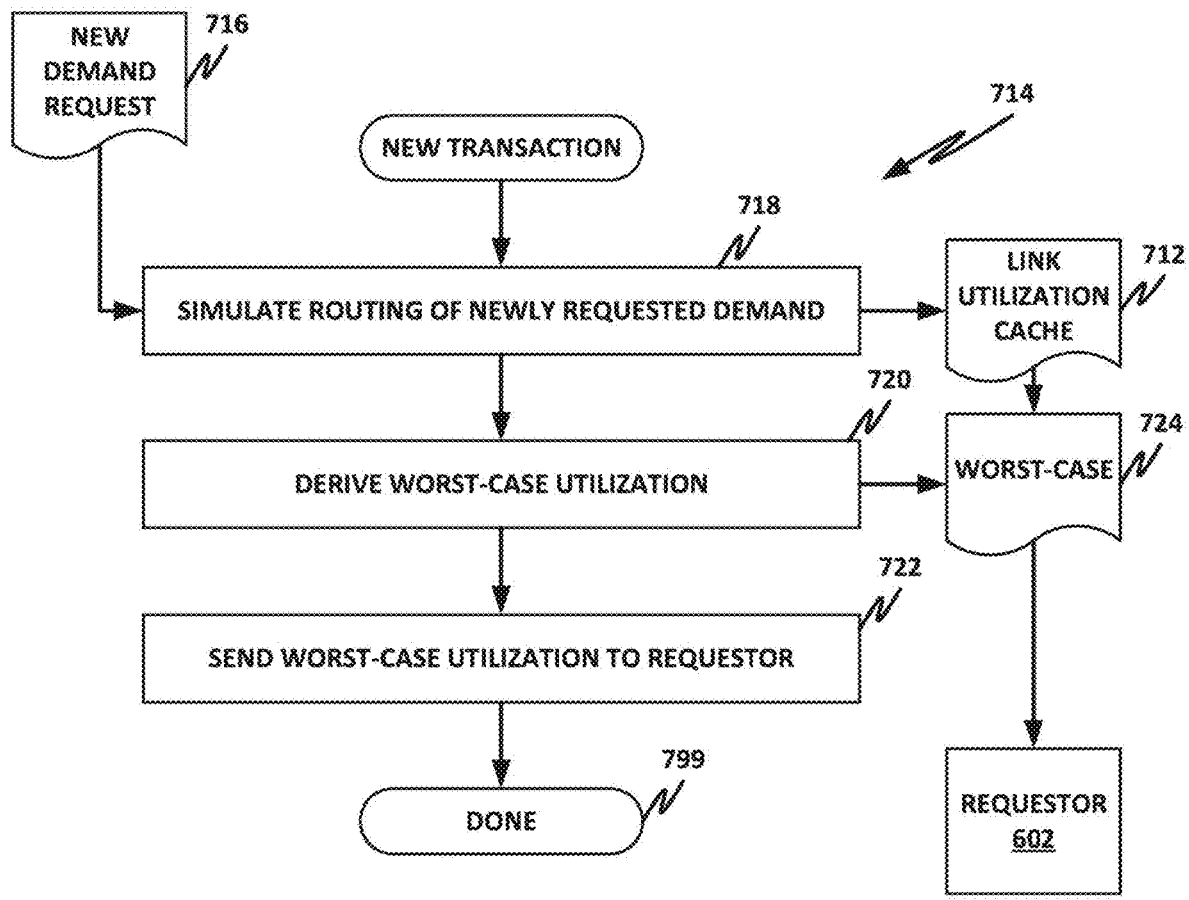

FIGS. 7a and 7b are a flow chart of a two-stage demand engineering method according to one or more examples of the present specification. To provide more responsive demand engineering, embodiments of a traffic manager function (including, for example, a demand engineering function) of this disclosure provide a two-stage simulation protocol.

FIG. 7a illustrates stage 1 700.

Decision block 702 is a timing loop. If the period has not expired, then the loop continues to wait until the period has expired. If the period has expired, then control passes to block 704. Thus in one embodiment, stage 1 700 is performed periodically as a background process. In an example, the period is five minutes, which is found to be an optimal interval in one particular embodiment (in that embodiment, no additional practical advantages are realized at frequencies greater than five minutes). In other embodiments, other suitable periods may be selected. Selecting a suitable period may comprise finding the highest frequency that the system supports, and that also continues to provide meaningful or substantial advantages over higher frequencies. For example, if the system can support no more than ten minute frequency, ten minutes may be selected. If the system can support up to seven minute frequencies, but no substantial advantages are found at frequencies higher than ten minutes, ten minutes may again be selected.

In block 704, DEF 502 polls the network for topology and traffic data.

In block 706, DEF 502 deduces the network traffic demand matrix from its understanding of the network topology and polled traffic data (e.g. using network tomography).

In block 708, DEF 502 simulates routing of the complete set of traffic demands on the discovered network topology to determine the resulting utilization of each link in the network, taking into account, for example, {link, node, shared risk link groups (SRLG)} failure cases if necessary.

The resulting link utilizations are cached in link utilization cache 712, for use in stage 2 714 described in FIG. 7b. Note that in this example, the result of the last complete simulation is stored in link utilization cache 712. In other examples, multiple historical states may be stored, such as to provide network analytics (e.g., how did the network change over a course of 24 hours). Thus, in one example, exactly one link utilization state is cached, while in other examples, multiple states are cached. Also note that link utilization is given as a non-limiting example of a traffic simulation, and the link utilization cache is given as an example of a traffic simulation cache. In other examples, other network metrics may be used.

FIG. 7b is a flow chart of stage 2 714 of the two-stage process of the present specification. This stage may be initiated each time a new transaction occurs, such as when a requestor 602 sends a new network demand request 716. The requestor may be attempting to site a new application or service instance, for example, and makes a request to DEF 502 to place a new demand or demands.

In block 718, DEF 502 simulates the routing of only the newly requested traffic demand(s) on the network topology discovered in stage 1 700 to determine the resulting traffic utilization of each link in the network, taking into account, for example, {link, node, SRLG} failure cases if necessary. These are added to link utilization cache 712. This may include calculating a "delta" between the network state according to the cached link utilization data and the current state. Thus, the only simulation required at this stage is a simulation of the delta.

In block 720, DEF 502 derives the worst-case utilization and stores the resulting worst-case link utilizations 724. This may be the same result as would be calculated if a single simulation was performed with the new demand added to the existing demands. This newly-derived utilization model may represent a delta between the cached link utilization simulation and the new state.

In block 722, DEF 502 responds to requester 602 by sending to requestor 602 the overall network worst-case utilization 724 (or other optimization goal).

In block 799, the method is done.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices 110 or server devices 300 may be provided, in whole or in part, in an SoC. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

Note also that in certain embodiment, some of the components may be omitted or consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor, such as processor 210, can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage such as storage 250 may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, such as memory 220 and storage 250, should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor such as processor 210 to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

Example Implementations

There is disclosed in one example, a computing apparatus, comprising: one or more logic elements, including at least a processor and a memory, comprising a network simulation engine to: periodically perform a network traffic simulation; and cache at least one network traffic simulation in a traffic state cache.

There is further disclosed an example, wherein the network simulation engine is further to: receive a request for additional network demand; and compute a network delta based at least in part on a difference between the request for additional network demand and the traffic state cache.

There is further disclosed an example, wherein the network simulation engine is further to cache the network delta as the traffic state cache.

There is further disclosed an example, wherein caching at least one network traffic simulation comprises caching exactly one network traffic simulation.

There is further disclosed an example, wherein caching at least one network traffic simulation comprises caching more than one network traffic simulation.

There is further disclosed an example, wherein the network simulation engine is further to compare a cached state to a previous cached state for network analysis.

There is further disclosed an example, wherein the traffic simulation is a link state analysis.

There is further disclosed an example of one or more tangible, non-transitory computer-readable storage mediums having stored thereon executable instructions for providing a network simulation engine to: periodically perform a network traffic simulation; and cache at least one network traffic simulation in a traffic state cache.

There is further disclosed an example, wherein the network simulation engine is further to: receive a request for additional network demand; and compute a network delta based at least in part on a difference between the request for additional network demand and the traffic state cache.

There is further disclosed an example, wherein the network simulation engine is further to cache the network delta as the traffic state cache.

There is further disclosed an example, wherein caching at least one network traffic simulation comprises caching exactly one network traffic simulation.

There is further disclosed an example, wherein caching at least one network traffic simulation comprises caching more than one network traffic simulation.

There is further disclosed an example, wherein the network simulation engine is further to compare a cached state to a previous cached state for network analysis.

There is further disclosed an example, wherein the traffic simulation is a link state analysis.

There is further disclosed an example of a computer-implemented method of providing network simulation for a software-defined network, comprising: periodically performing a network traffic simulation; and caching at least one network traffic simulation in a traffic state cache.

There is further disclosed an example, further comprising: receiving a request for additional network demand; and computing a network delta based at least in part on a difference between the request for additional network demand and the traffic state cache.

There is further disclosed an example, wherein the network simulation engine is further to cache the network delta as the traffic state cache.

There is further disclosed an example, wherein caching at least one network traffic simulation comprises caching exactly one network traffic simulation.

There is further disclosed an example, wherein caching at least one network traffic simulation comprises caching more than one network traffic simulation.

There is further disclosed an example, wherein the traffic simulation is a link state analysis.

There is further disclosed an example of one or more tangible, non-transitory computer-readable storage mediums having stored thereon executable instructions for instructing one or more processors for providing a network simulation engine operable for performing any or all of the operations of the preceding examples.

There is further disclosed an example of a method of providing a network simulation engine comprising performing any or all of the operations of the preceding examples.

There is further disclosed an example of an apparatus comprising means for performing the method.

There is further disclosed an example wherein the means comprise a processor and a memory.

There is further disclosed an example wherein the means comprise one or more tangible, non-transitory computer-readable storage mediums.

There is further disclosed an example wherein the apparatus is a computing device.

What is claimed is:

1. A computer-implemented method of providing a two-stage demand engineering process for a software-defined network, comprising:
    during a first stage of the demand engineering process:
        polling the software-defined network to obtain a network topology and traffic data for the software-defined network;
        simulating routing of a first set of traffic demands on the obtained network topology to determine a set of link utilizations for each link in the software-defined network; and
        caching at least one set of link utilizations in a link utilization cache; and
    during a second stage of the demand engineering process:
        receiving a request for additional traffic demand;
        in response to the request, simulating routing of a second set of traffic demands on the obtained network topology to determine a new set of link utilizations for each link in the software-defined network, wherein the second set of traffic demands includes only the additional traffic demand not included in the first set of traffic demands; and
        combining the new set of link utilizations for the additional traffic demand with the at least one set of link utilizations in the link utilization cache to provide a newly-derived utilization model for the software-defined network.

2. The computer-implemented method of claim 1, wherein simulating routing of the first set of traffic demands includes taking into account at least one failure scenario.

3. The computer-implemented method of claim 2, wherein the at least one failure scenario is selected from a set of failure scenarios comprising:
    a) no failures;
    b) a single circuit failure;
    c) a single node failure; and
    d) a shared risk failure wherein groups of circuits or nodes fail simultaneously as a result of a single event.

4. The computer-implemented method of claim 3, wherein all of the failure scenarios from the set of failure scenarios are taken into account when simulating routing of the first set of traffic demands.

5. The computer-implemented method of claim 1, wherein the first stage is repeated periodically.

6. The computer-implemented method of claim 1, wherein combining the new set of link utilizations with the at least one set of link utilizations in the link utilization cache includes calculating a difference between the at least one set of link utilizations in the link utilization cache and the new set of link utilizations.

7. The computer-implemented method of claim 1, wherein simulating routing of the first set of traffic demands and simulating routing of the second set of traffic demands includes satisfying one or more Service Level Agreement (SLA) requirements for the software-defined network.

8. A computing apparatus, comprising:
    one or more logic elements, including at least a processor and a memory, comprising a network simulation engine to provide a two-stage demand engineering process for a software-defined network including:
    during a first stage of the demand engineering process:
        poll the software-defined network to obtain a network topology and traffic data for the software-defined network;
        simulate routing of a first set of traffic demands on the obtained network topology to determine a set of link utilizations for each link in the software-defined network; and
        cache at least one set of link utilizations in a link utilization cache; and
    during a second stage of the demand engineering process:
        receive a request for additional traffic demand;
        in response to the request, simulate routing of a second set of traffic demands on the obtained network topology to determine a new set of link utilizations for each link in the software-defined network, wherein the second set of traffic demands includes only the additional traffic demand not included in the first set of traffic demands; and
        combine the new set of link utilizations for the additional traffic demand with the at least one set of link utilizations in the link utilization cache to provide a newly-derived utilization model for the software-defined network.

9. The computing apparatus of claim 8, wherein the network simulation engine is further configured to:
    simulate routing of the first set of traffic demands taking into account at least one failure scenario.

10. The computing apparatus of claim 9, wherein the at least one failure scenario is selected from a set of failure scenarios comprising:
    a) no failures;
    b) a single circuit failure;
    c) a single node failure; and
    d) a shared risk failure wherein groups of circuits or nodes fail simultaneously as a result of a single event.

11. The computing apparatus of claim 10, wherein the network simulation engine is further configured to take into account all of the failure scenarios from the set of failure scenarios when simulating routing of the first set of traffic demands.

12. The computing apparatus of claim 8, wherein the network simulation engine is further configured to periodically repeat the first stage.

13. The computing apparatus of claim 8, wherein combining the new set of link utilizations with the at least one set of link utilizations in the link utilization cache includes calculating a difference between the at least one set of link utilizations in the link utilization cache and the new set of link utilizations.

14. The computing apparatus of claim 8, wherein the network simulation engine is further configured to satisfy one or more Service Level Agreement (SLA) requirements for the software-defined network when simulating routing of the first set of traffic demands and simulating routing of the second set of traffic demands.

15. One or more non-transitory computer-readable storage media having stored thereon executable instructions for providing a network simulation engine to provide a two-stage demand engineering process for a software-defined network including:

during a first stage of the demand engineering process:
  poll the software-defined network to obtain a network topology and traffic data for the software-defined network;
  simulate routing of a first set of traffic demands on the obtained network topology to determine a set of link utilizations for each link in the software-defined network; and
  cache at least one set of link utilizations in a link utilization cache; and
during a second stage of the demand engineering process:
  receive a request for additional traffic demand;
  in response to the request, simulate routing of a second set of traffic demands on the obtained network topology to determine a new set of link utilizations for each link in the software-defined network, wherein the second set of traffic demands includes only the additional traffic demand not included in the first set of traffic demands; and
  combine the new set of link utilizations for the additional traffic demand with the at least one set of link utilizations in the link utilization cache to provide a newly-derived utilization model for the software-defined network.

16. The one or more non-transitory computer-readable storage media of claim 15, wherein the network simulation engine is further configured to:
  simulate routing of the first set of traffic demands taking into account at least one failure scenario selected from a set of failure scenarios comprising:
    a) no failures;
    b) a single circuit failure;
    c) a single node failure; and
    d) a shared risk failure wherein groups of circuits or nodes fail simultaneously as a result of a single event.

17. The one or more non-transitory computer-readable storage media of claim 16, wherein the network simulation engine is further configured to take into account all of the failure scenarios from the set of failure scenarios when simulating routing of the first set of traffic demands.

18. The one or more non-transitory computer-readable storage media of claim 15, wherein the network simulation engine is further configured to periodically repeat the first stage.

19. The one or more non-transitory computer-readable storage media of claim 15, wherein combining the new set of link utilizations with the at least one set of link utilizations in the link utilization cache includes calculating a difference between the at least one set of link utilizations in the link utilization cache and the new set of link utilizations.

20. The one or more non-transitory computer-readable storage media of claim 15, wherein the network simulation engine is further configured to satisfy one or more Service Level Agreement (SLA) requirements for the software-defined network when simulating routing of the first set of traffic demands and simulating routing of the second set of traffic demands.

* * * * *